United States Patent
Gonzalez et al.

(10) Patent No.: US 10,874,984 B2
(45) Date of Patent: Dec. 29, 2020

(54) EXHAUST GAS POLLUTION CONTROL FLUID COMPRISING A SOLUBLE BASIC METAL CARBONATE, PROCESS FOR PREPARING SAME AND USE THEREOF FOR INTERNAL- COMBUSTION ENGINES

(71) Applicant: IFP Energies nouvelles, Rueil-Malmaison (FR)

(72) Inventors: Serge Gonzalez, Jonage (FR); David Pasquier, Lyons (FR); Jacques Vallet, Lyons (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 0 days.

(21) Appl. No.: 16/467,197

(22) PCT Filed: Oct. 31, 2017

(86) PCT No.: PCT/EP2017/077851
§ 371 (c)(1),
(2) Date: Jun. 6, 2019

(87) PCT Pub. No.: WO2018/103955
PCT Pub. Date: Jun. 14, 2018

(65) Prior Publication Data
US 2020/0078733 A1    Mar. 12, 2020

(30) Foreign Application Priority Data
Dec. 7, 2016 (FR) ...................................... 16 62057

(51) Int. Cl.
*B01D 53/90* (2006.01)
*B01D 53/92* (2006.01)
*B01D 53/94* (2006.01)

(52) U.S. Cl.
CPC ........... *B01D 53/90* (2013.01); *B01D 53/925* (2013.01); *B01D 53/944* (2013.01);
(Continued)

(58) Field of Classification Search
CPC .... B01D 53/90; B01D 53/925; B01D 53/944; B01D 2251/2067; B01D 2251/606;
(Continued)

(56) References Cited

U.S. PATENT DOCUMENTS 3,449,063 A    6/1969 Griffing et al.
6,051,040 A    4/2000 Peter-Hoblyn
(Continued)

FOREIGN PATENT DOCUMENTS

EP    2541012 A2    1/2013
FR    3043568 A1    5/2017
(Continued)

OTHER PUBLICATIONS

International Search Report for PCT/EP2017/077851, dated Jan. 30, 2018; English translation submitted herewith (9 pgs.).
(Continued)

*Primary Examiner* — Hoang M Nguyen
(74) *Attorney, Agent, or Firm* — Fitch, Even, Tabin & Flannery, LLP

(57) ABSTRACT

The invention relates to a fluid suited for depollution of exhaust gas, notably in internal-combustion engines, allowing both to perform catalytic reduction of the nitrogen oxides (DeNOx) contained in the exhaust gas and to provide particulate filter (PAF) regeneration aid. The fluid is a homogeneous aqueous solution of a reductant or a reductant precursor for the DeNOx process, and it comprises a metallic additive for catalyzing the oxidation of exhaust gas particles. This metallic additive is a basic metal carbonate soluble in said aqueous solution. The invention also
(Continued)

describes the preparation method and the use thereof for the depollution of exhaust gas of internal-combustion engines.

14 Claims, 3 Drawing Sheets

(52) U.S. Cl.
CPC ............... *B01D 2251/2067* (2013.01); *B01D 2251/606* (2013.01); *B01D 2255/20753* (2013.01); *B01D 2255/20761* (2013.01); *B01D 2258/012* (2013.01)

(58) Field of Classification Search
CPC ........... B01D 2255/20753; B01D 2255/20761; B01D 2258/012; B01D 2259/124; B01D 53/9409; F01N 2610/01; F01N 2610/02; F01N 3/206; F01N 3/029
USPC ............................ 60/274, 282, 295, 299, 301
See application file for complete search history.

(56) References Cited

U.S. PATENT DOCUMENTS

| | | | | |
|---|---|---|---|---|
| 8,753,596 B2* | 6/2014 | Spurk | ................ | B01D 53/9418 423/213.2 |
| 2002/0086792 A1* | 7/2002 | Labarge | ............ | B01D 53/9422 502/64 |
| 2002/0086795 A1* | 7/2002 | LaBarge | ............ | B01D 53/9422 502/208 |
| 2011/0239626 A1 | 10/2011 | Makkee et al. | | |
| 2012/0233985 A1* | 9/2012 | Chen | .................. | F01N 13/0097 60/274 |
| 2013/0334466 A1* | 12/2013 | Gadgil | .............. | B01D 53/8631 252/373 |
| 2018/0304198 A1 | 10/2018 | Lecolier et al. | | |
| 2018/0345216 A1 | 12/2018 | Gonzalez et al. | | |
| 2018/0371974 A1 | 12/2018 | Dalmazzone et al. | | |

FOREIGN PATENT DOCUMENTS

| | | |
|---|---|---|
| FR | 3043569 A1 | 5/2017 |
| FR | 3043570 A1 | 5/2017 |
| WO | 2016/091657 A1 | 6/2016 |

OTHER PUBLICATIONS

Balitsky VS et al: "Physico-chemical foundations of malachite synthesis and structural-morphological peculiarities and properties of its man-made jewelry quality varieties", Progress in Crystal Growth and Characterization of Materials, Elsevier Publishing, Barking, GB, vol. 21, No. 1-4, Jan. 1, 1991 (Jan. 1, 1991), pp. 139-161.

Smith J W H et al: "The investigation of copper-based impregnated activated carbons prepared from water-soluble materials for broad spectrum respirator applications", Journal of Hazardous Materials, Elsevier, Amsterdam, NL, vol. 180, No. 1-3, Aug. 15, 2010 (Aug. 15, 2010), pp. 419-428.

Zhai Y C et al: "A green process for recovering nickel from nickeliferous laterite ores", Transactions of Nonferrous Metals Society of China : English Edition= Zhongguo-Youse-Jinshu-Xuebao, Elsevier, Amsterdam, NL, vol. 20, May 1, 2010 (May 1, 2010), pp. s65-s70.

* cited by examiner

EXHAUST GAS POLLUTION CONTROL FLUID COMPRISING A SOLUBLE BASIC METAL CARBONATE, PROCESS FOR PREPARING SAME AND USE THEREOF FOR INTERNAL- COMBUSTION ENGINES

CROSS-REFERENCE TO RELATED APPLICATIONS

This application is a U.S. national phase application filed under 35 U.S.C. § 371 of International Application No. PCT/EP2017/077851, filed Oct. 31, 2017, designating the United States, which claims priority from French Patent Application No. 16/62.057, filed Dec. 7, 2016, which are hereby incorporated herein by reference in their entirety.

FIELD OF THE INVENTION

The present invention relates to the field of depollution of exhaust gas, notably of internal-combustion engines, in particular for motor vehicles.

More particularly, the present invention concerns a single fluid for motor vehicles depollution, allowing two distinct operations to be performed: selective catalytic reduction of nitrogen oxides, known as NOx, using the Selective Catalytic Reduction (SCR) technology, and particulate filter (PAF) regeneration aid. Regeneration aid can either consist in the promotion of continuous particulate filter regeneration, or in the particle combustion acceleration during active PAF regeneration phases, or in a combination of these two advantages.

The fluid according to the invention is homogeneous and it has stability characteristics over time, or when temperature or pH variations occur.

The present invention also describes the method of preparing the fluid, as well as the use thereof.

BACKGROUND OF THE INVENTION

As it is well known, exhaust gases from Diesel type internal-combustion engines contain many pollutants such as pollutants in gas form, like unburnt hydrocarbons (HC), carbon monoxide (CO), nitrogen oxides NOx (NO and $NO_2$ for example), as well as particles. These particles are predominantly soot particles (carbon compounds). They may also comprise inorganic compounds resulting from engine wear or contained in the lubricants and their additives, or in fuels. Soot and these inorganic compounds form ash that remains in the filter and accumulates over the life of the engine.

It is widely agreed that NOx emissions result from the combustion that occurs at high temperatures and in the presence of oxygen. These conditions are generally encountered in any type of combustion, in particular those taking place under lean burn conditions, such as direct injection in lean burn mode, whatever the fuel used. Now, NOx emissions involve a major drawback as they have a harmful effect directly on human health, in particular $NO_2$, and indirectly through the secondary formation of tropospheric ozone.

In order to comply with emissions standards and to preserve the environment and human health, it has become necessary to treat these pollutants prior to discharging the exhaust gas to the atmosphere.

As it is well known, this is generally achieved by means of a treatment for depolluting the exhaust gas circulating in the exhaust line of the engine.

Thus, in order to treat the unburnt hydrocarbons and the carbon monoxide from engines running with a lean mixture, catalysis means such as an oxidation catalyst are arranged on the exhaust line.

As regards exhaust gas, in particular for Diesel engines, a particulate filter PAF is advantageously arranged on this line so as to capture and to eliminate the particles present in the exhaust gas, and thus to avoid discharging them to the atmosphere.

This filter, which can also be a catalyzed filter (SCRF) for selective catalytic NOx reduction as described below, needs to be periodically regenerated in order to keep all of its filtration capacities by achieving combustion of the particulates retained in this filter. These regeneration operations mainly consist in increasing the filter temperature, which may either occur spontaneously when using the engine at high load, or be generated by an exothermic oxidation, on a catalyst arranged upstream from the filter, of reducing chemical species resulting from the combustion or from an injection directly into the exhaust, triggered by the engine control.

As regards NOx emissions, the exhaust gas also flows through other catalysis means, notably catalysts of SCR type. This SCR catalyst allows to selectively reduce the NOx to nitrogen through the action of a reductant. This reductant, which is generally injected upstream from the SCR catalyst, can be ammonia or a compound generating ammonia by decomposition, such as urea, or a hydrocarbon from a hydrocarbon-containing substance, oxygenated or not. Currently, the commonest technique for NOx depollution is SCR catalysis using ammonia. This ammonia is indirectly obtained by decomposition of a precursor injected in liquid form, generally a 32.5 mass % aqueous urea solution, better known under the brand name AdBlue® (or AUS32 or ARLA32). Thus, the urea solution is injected into the exhaust line upstream from the SCR catalyst. The water contained in this solution is rapidly vaporized under the effect of the exhaust gas temperature, then each urea molecule decomposes in two stages into two ammonia molecules:

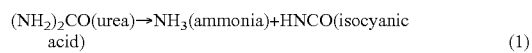
$$(NH_2)_2CO(\text{urea}) \rightarrow NH_3(\text{ammonia}) + HNCO(\text{isocyanic acid}) \quad (1)$$

$$HNCO + H_2O \rightarrow NH_3 + CO_2 \quad (2)$$

Alternatively, ammonia can be directly injected in gas state into the exhaust line upstream from the SCR catalyst.

Systems wherein additives may be injected into the exhaust gas in order to improve the exhaust gas depollution are known.

An example of a mixture of an additive for particulate filter regeneration and of a reductant for NOx elimination injected upstream from the SCRF filter is described in patent application EP-2,541,012. The additive in question, which may be a material containing cerium or iron, has an oxygen storage and release capacity, which allows to supply oxygen to the SCRF filter and thus to lower the regeneration temperature in the particulate filter, therefore protecting the catalyst used for selective NOx reduction in the SCRF filter from degradation. Although this system is satisfactory, it however involves not insignificant drawbacks. Indeed, using the additive offers few advantages in an already oxygen-rich medium, as it is the case for an exhaust line of a lean running engine. Besides, it is described that the catalytic phase of the SCR catalyst is protected only when it is coated in a particulate filter. This excludes in fact configurations where the particulate filtration and NOx catalytic reduction by SCR functions are performed on dissociated elements. Furthermore, the described system only concerns situations where the exhaust gas temperature is high. Therefore, combustion of the particles is likely to further increase the temperature within the SCRF filter, which may lead to catalytic phase deterioration.

In order to overcome some of these drawbacks, patent application WO-2016/091,657 provides a single fluid combining nitrogen oxides reduction functions and particulate regeneration aid functions for the particles trapped in the particulate filter, which can be injected into the exhaust gas line of an internal-combustion engine, upstream from the gas treatment system. This single fluid can be a mixture of a reductant containing ammonia or of a compound generating ammonia by decomposition, such as AdBlue®, and of an additive for catalyzing the oxidation of the particles.

The patent applications filed at the end of 2015 under Numbers 15/60,906, 15/60,907 and 15/60,908 relate to various implementations of such a fluid for exhaust gas depollution, in particular a fluid in form of a stable suspension of colloidal particles, a fluid in form of a homogeneous solution and a fluid in form of an emulsion.

The present application may be considered as an improvement of patent applications WO-2016/091,657 and Ser. No. 15/60,907.

SUMMARY OF THE INVENTION

The present invention aims in particular to provide a single fluid combining the regeneration aid and nitrogen oxides reduction functions as described in patent applications WO-2016/091,657 and 15/60,907, easy to implement and enabling effective exhaust gas depollution, in particular one that can be obtained without requiring the potentially complicated preparation of a suspension of particles or of an emulsion, or the use of specific complexing agents, chelating agents or ligands for dissolving the metallic compound.

Thus, in order to reach at least one of the aforementioned objectives, among others, the present invention provides, according to a first aspect, a fluid suited for depollution of exhaust gas, notably of internal-combustion engines, said fluid consisting of a homogeneous aqueous solution of at least one reductant or reductant precursor for elimination of the nitrogen oxides NOx contained in the exhaust gas, said aqueous solution comprising a metallic additive for catalyzing the oxidation of exhaust gas particles in a particulate filter, said metallic additive being a basic metal carbonate soluble in said aqueous solution.

According to an embodiment of the invention, the reductant or reductant precursor is selected from the list made up of urea, formamide, ammonium salts, guanidine salts, and preferably the reductant or reductant precursor is urea.

According to an implementation of the invention, the reductant or reductant precursor is urea in solution in pure water.

Preferably, the reductant or reductant precursor is 32.5±0.7 mass % urea in solution in pure water, meeting the specifications of the ISO 22241-1 standard.

Advantageously, the homogeneous aqueous solution of the reductant is prepared from the commercial product AdBlue®.

According to an embodiment of the invention, the basic metal carbonate belongs to the 05.BA family in the Nickel-Strunz classification.

Preferably, the basic metal carbonate is selected from the list made up of basic copper carbonate of chemical formula $Cu_3(CO_3)_2(OH)_2$, basic copper carbonate of chemical formula $Cu_2(CO_3)(OH)_2$, basic nickel carbonate of chemical formula $Ni_2(CO_3)(OH)_2$, basic copper and nickel carbonate of chemical formula $(Cu,Ni)_2(CO_3)(OH)_2$, and more preferably from the list made up of basic copper carbonate of chemical formula $Cu_3(CO_3)_2(OH)_2$ and basic copper carbonate of chemical formula $Cu_2(CO_3)(OH)_2$.

Thus, the basic metal carbonate is preferably the basic copper carbonate of chemical formula $Cu_2(CO_3)(OH)_2$.

Advantageously, the depollution fluid comprises no additional agent for complexing, liganding, chelating a metal ion of the metallic additive.

According to a second aspect, the present invention relates to a method for preparing the depollution fluid according to the invention wherein a basic metal carbonate soluble in an aqueous solution of at least one reductant or reductant precursor compound is added thereto so as to form a homogeneous solution.

According to an implementation, addition of the basic metal carbonate to the aqueous solution is performed under stirring and it preferably comprises an additional stirring step after the carbonate addition step.

According to a third aspect, the present invention relates to the use of the fluid according to the invention in an internal-combustion engine for the depollution of exhaust gas comprising particles and nitrogen oxides NOx, the fluid being injected into the exhaust gas upstream from exhaust gas treatment systems comprising particle filtration and selective catalytic reduction of nitrogen oxides NOx, injection being carried out depending on the operating conditions of the internal-combustion engine, preferably in a uniform manner.

Preferably, injection is carried out if the previously determined exhaust gas temperature exceeds a threshold value allowing the treatment of the nitrogen oxides NOx to be started.

Particle filtration and selective catalytic reduction of nitrogen oxides NOx can be performed in a single device, a catalyzed SCRF filter.

Alternatively, particle filtration can be conducted in a particulate filter PAF upstream from a catalysis device for selective catalytic reduction of nitrogen oxides NOx, fluid injection being then carried out upstream from the particulate filter PAF.

Selective catalytic reduction of nitrogen oxides NOx can also be performed in a SCR catalysis device upstream from the particle filtration in a particulate filter PAF, fluid injection being then carried out upstream from the SCR catalysis device.

BRIEF DESCRIPTION OF THE FIGURES

Other features and advantages of the invention will be clear from reading the description given hereafter by way of non limitative example, with reference to the accompanying figures wherein.

DETAILED DESCRIPTION OF THE INVENTION

The present invention provides a fluid intended for depollution of exhaust gas, notably of an internal-combustion engine, allowing both to perform selective catalytic reduction of the nitrogen oxides NOx contained in the exhaust gas (SCR function) and to provide particulate filter (PAF) regeneration aid through catalytic oxidation of the particles settled in the filter (function known as PAF regeneration aid), and this regeneration aid can either consist in the promotion of continuous particulate filter regeneration, or in the soot combustion acceleration during active PAF regeneration phases, or in a combination of these two advantages.

The particles contained in the exhaust gas are predominantly soot particles (carbon compounds). They may also comprise inorganic compounds resulting from engine wear or contained in the lubricants, the fuels and/or their additives. The oxidation of particles in the PAF as referred to in the present description is the oxidation of soot particles.

The inventors have shown that it is possible to provide a depollution fluid combining the main two depollution functions, i.e. NOx reduction and catalytic particle oxidation, that is stable over time, preferably temperature and pH stable, and easy to prepare.

More specifically, the present invention relates to a fluid, to the preparation method and the use thereof for treating pollutants contained in the exhaust gas of a Diesel type internal-combustion engine, notably for motor vehicles, but this does not rule out by any means its application to spark-ignition engines, such as those running on gaseous fuel or gasoline, in particular under lean burn conditions.

Thus, the internal-combustion engine is understood to be a Diesel engine, but this does not rule out by any means all the other internal-combustion engines such as engines running on gasoline or gas.

Figure 1:
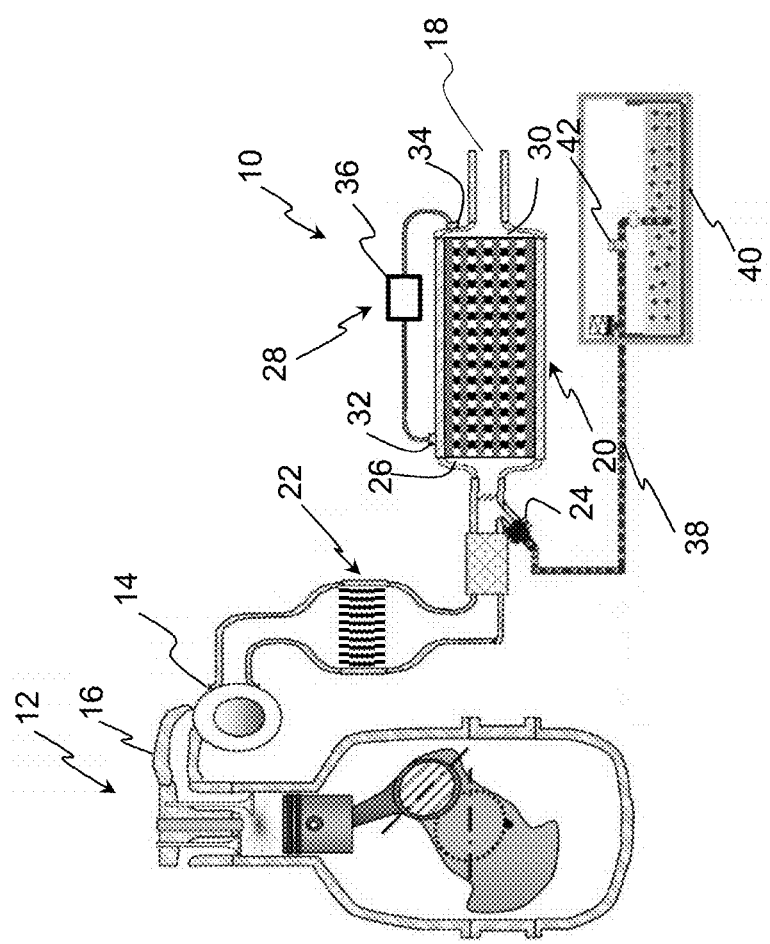
FIG. 1 is a diagram that illustrates an example of use of the fluid according to the invention in the exhaust line of a Diesel type internal-combustion engine.

The utilization principle of the fluid according to the invention is detailed hereafter in the description, notably in connection with FIG. 1.

The principle of the fluid according to the invention is to combine in a single aqueous solution a compound, e.g. urea, that will act as a reductant or a reductant precursor for elimination of the NOx contained in the exhaust gas, and a metallic additive which, in the exhaust line, under the effect of temperature and of the residual oxygen of the exhaust gas, will turn into a compound capable of increasing the oxidation rate of the soot particles through a catalytic process, and possibly of decreasing the oxidation temperature of the soot particles, thus providing PAF regeneration aid.

Thus, one advantage of the fluid according to the invention is that the composition of this fluid cumulates both engine depollution functions in a single fluid.

The fluid according to the invention consists of a homogeneous aqueous solution of at least one reductant or reductant precursor for elimination of nitrogen oxides NOx contained in the exhaust gas. The solution comprises a metallic additive for catalyzing the oxidation of particles contained in the exhaust gas in a particulate filter. This metallic additive is a basic metal carbonate soluble in the aqueous solution.

According to the invention, the fluid containing the metallic additive, which allows oxidation of the particles in the particulate filter to be catalyzed, is directly injected into the exhaust and it does not flow through the combustion chamber of the engine, as may be the case in some known systems, such as the system described in patent application EP-1,378,560.

The basic metal carbonate solubilized in the aqueous solution of the reductant or the reductant precursor for elimination of the nitrogen oxides NOx contained in the exhaust gas belongs to the 05.BA family of the Nickel-Strunz classification that categorizes minerals based upon their chemical composition. Among the compounds of this family, only those soluble in the aqueous solution of a reductant or a reductant precursor for elimination of the nitrogen oxides NOx contained in the exhaust gas can be selected as the metallic additive for the fluid according to the invention. According to this classification, the 05.BA family concerns the carbonates with additional anions and without additional $H_2O$, comprising at least one of the following elements: Cu, Co, Ni, Zn, Mg, Mn.

The term metal hydroxycarbonate is sometimes used to designate a basic metal carbonate.

Advantageously, the solubilized basic metal carbonate is selected from the list made up of:

basic copper carbonate of chemical formula $Cu_3(CO_3)_2(OH)_2$, called azurite and classified in the 05.BA.05 group according to the Nickel-Strunz classification, basic copper carbonate of chemical formula $Cu_2(CO_3)(OH)_2$, called malachite and classified in the 05.BA.10 group according to the Nickel-Strunz classification, basic nickel carbonate of chemical formula $Ni_2(CO_3)(OH)_2$, called nullaginite and classified in the 05.BA.10 group according to the Nickel-Strunz classification, and basic copper and nickel carbonate of chemical formula $(Cu,Ni)_2 (CO_3) (OH)_2$, called glaukosphaerite and classified in the 05.BA.10 group according to the Nickel-Strunz classification.

Preferably, the solubilized basic metal carbonate is basic copper carbonate of chemical formula $Cu_3(CO_3)_2(OH)_2$ (azurite), basic copper carbonate of chemical formula $Cu_2(CO_3) (OH)_2$ (malachite) or a mixture thereof, and it is, more preferably, basic copper carbonate of chemical formula $Cu_2(CO_3) (OH)_2$ (malachite).

The aforementioned basic metal carbonates, added to an aqueous solution of a reductant or a reductant precursor for elimination of nitrogen oxides NOx contained in the exhaust gas, provide a sufficient concentration of at least one metal ion, e.g. nickel and/or copper, preferably copper, promoting oxidation of the soot particles in a PAF arranged on the exhaust line.

Advantageously, the fluid according to the invention comprises no additional complexing agent, chelating agent or ligand for forming a complexed, liganded or chelated metal ion in the aqueous reductant or reductant precursor solution. Indeed, the basic metal carbonate(s) described are directly soluble in said aqueous reductant or reductant precursor solution. Thus, one advantage of the invention lies in the ease of implementation of the depollution fluid. According to the invention, the potentially complicated preparation of emulsions is thus unnecessary, as is the use of surfactants, or the addition of specific complexing agents, chelating agents or ligands for dissolving the metal ions in the aqueous reductant or reductant precursor solution. In addition to the additional costs related to the use of such specific complexing or chelating agents or ligands, the latter may be oxidation catalyst "poisons", comprising for example unwanted sulfur, phosphorus or sodium, likely to hinder catalyst performance. The invention also affords the advantage of being easy to implement in relation to a fluid in form of a colloidal suspension that generally requires stabilization in order not to undergo sedimentation. In the present description, the term "solution" excludes any solid phase in the liquid phase, any form of colloidal suspension or emulsion type (mixtures of immiscible liquid phases). The solution according to the invention is therefore a single-phase solution. The solution obtained is thus clear.

Furthermore, the homogeneous aqueous solution according to the invention shows stability over time, in a pH range from 7 to 12, and in particular up to a temperature of 60° C.

The depollution fluid according to the invention remains preferably stable in a temperature range from −11° C. to +60° C.

Preferably, the reductant or the reductant precursor is selected from the list made up of urea, formamide and ammonium salts, notably ammonium formiate, ammonium carbamate, guanidine salts, notably guanidinium formiate, and preferably the reductant or reductant precursor is urea.

According to an implementation of the invention, the reductant or reductant precursor is urea in solution in pure water.

The reductant or reductant precursor is advantageously 32.5±0.7 mass % urea in solution in pure water so as to provide a solution meeting the specifications of the ISO 22241-1 standard.

For example, the homogeneous aqueous solution of the reductant is prepared from the commercial product AdBlue®.

The term AdBlue® is used in the present description to indiscriminately designate the following products: AdBlue®, DEF, AUS32, ARLA32 or Diaxol.

According to the invention, the fluid is obtained as follows: a basic metal carbonate soluble in an aqueous solution of at least one reductant or reductant precursor compound is added thereto so as to form a homogeneous solution. The soluble basic metal carbonate is a metal salt as described above. The solution obtained is clear.

There are different ways of preparing the fluid according to the invention, depending on the choice made for the aqueous solution of the reductant or the reductant precursor, corresponding to several variants.

The simplest one consists in modifying a commercial solution of AdBlue® by addition of the soluble basic metal carbonate.

One advantage of the invention is not to substantially modify the density, viscosity and conservation properties of the AdBlue® solution, which means in practice that no modification of the system for injecting the AdBlue® solution into the engine is required to benefit from the advantages of the invention.

It is also possible to prepare an aqueous urea solution meeting the ISO 22241-1 specifications, or to use another reductant to form an aqueous solution, and to add a soluble basic metal carbonate to said solution so as to form a homogeneous aqueous solution.

Thus, according to a preferred variant of the present invention, the aqueous solution containing the reductant(s) or the reductant precursor(s) is prepared from a product meeting the specifications of the ISO 22241-1 standard, for example the commercial products AdBlue®, DEF, AUS32 or ARLA32, preferably from the commercial product AdBlue®.

According to another preferred variant of the present invention, the solution containing the reductant(s) or the reductant precursor(s) is prepared from a product meeting the physical and chemical characteristics of the ISO 22241-1 standard, for example the commercial product Diaxol®.

The step of adding the basic metal carbonate to the aqueous reductant or reductant precursor solution can be carried out under stirring, to provide better homogenization of the solution.

A stirring step can also be carried out after adding the basic metal carbonate, to accelerate dissolution, for example for at least 30 minutes.

The homogeneous aqueous solution making up the fluid according to the invention is clear.

The proportion of metal in solution in ionic form in the final fluid composition can range between 1 and 10,000 ppm, preferably between 1 and 5000 ppm, and more preferably between 10 and 2000 ppm. A reduction in the metal content is preferred because it prevents the accumulation of metallic ash in the PAF.

The fluid as described in the present invention is stable over time in a pH range between 7 and 12. According to the invention, the stability of the fluid according to the invention includes the non-appearance of insoluble metal hydroxide precipitates in this pH range.

The depollution fluid according to the invention has good light stability. The action of light does not modify the stability of the solution, and the urea crystallization and stability conditions are not affected.

Prolonged exposure to temperatures up to +60° C. does not impair this stability either. Advantageously, the depollution fluid according to the invention remains preferably stable in a temperature range from −11° C. to +60° C.

Thawing the solution after freezing to the core allows to recover the pre-freeze properties of the solution (no precipitation). Finally, in cases where the fluid is prepared from a urea or an AdBlue® solution, the amount of agent(s) added to the solution remains low and allows to meet the normalized urea concentration of 32.5±0.7%.

According to the invention, the depollution fluid as described is used in an internal-combustion engine for depollution of the exhaust gas containing particles and NOx, the fluid being injected into the exhaust gas upstream from exhaust gas treatment systems comprising particulate filtration (PAF) and selective catalytic NOx reduction (SCR). The injection is performed depending on the operating conditions of the internal-combustion engine, preferably in a uniform manner.

FIG. 1 illustrates an example of use of the fluid according to the invention in a depollution treatment facility for exhaust gases from an internal-combustion engine of Diesel 12 type, for example for a motor vehicle. Such a facility is known, as well as the fluid utilization principle, and it is similar to the one described in patent application WO-2016/091,657.

The depollution facility comprises an exhaust line 10 carrying the exhaust gas coming from the combustion chamber of the engine to the atmosphere.

Exhaust line 10 comprises an exhaust gas treatment system comprising a means for filtering the particles present in the exhaust gas and a means for selective catalytic reduction of the nitrogen oxides NOx also contained in this gas.

In particular, exhaust line 10 comprises, in the direction of circulation of the exhaust gas from inlet 14 near to exhaust manifold 16 of the engine to outlet 18 where it vents to open air, at least one means for capture and elimination of the particles, as well as a NOx reduction means.

Advantageously, but not necessarily, these means are combined in a single element better known as SCR catalyzed filter 20 or SCRF filter.

Preferably, this SCRF filter 20 is arranged downstream from an oxidation catalyst 22 whose purpose is to treat the unburnt hydrocarbons and the carbon monoxide contained in the exhaust gas before the latter passes through the SCRF filter. This oxidation catalyst 22 is also intended to partly convert the nitrogen monoxide NO to nitrogen dioxide $NO_2$, the ideal case being an equimolar distribution among nitrogen monoxide and nitrogen dioxide at the SCRF filter inlet so as to maximize the efficiency thereof.

The exhaust line comprises a means, preferably an injector 24, for feeding the depollution fluid according to the invention for particulate filter regeneration and NOx elimination.

This injector is arranged upstream from the SCRF filter. Preferably, the injector is arranged near to its inlet 26 so that this mixture can combine as homogeneously as possible with the exhaust gases before they are fed to the SCRF filter.

As is generally well known, the line comprises a means 28 for determining the differential pressure between SCRF filter inlet 26 and its outlet 30.

By way of example, this means comprises an upstream pressure detector 32 arranged at SCRF filter inlet 26 which measures the exhaust gas pressure at this inlet, another detector 34, referred to as downstream detector, arranged at SCRF filter outlet 30, which measures the exhaust gas pressure at this outlet, and a calculation unit 36 for determining the pressure difference between the SCRF filter inlet and outlet. This allows the SCRF filter clogging rate due to the particles to be known.

In a manner known per se, the exhaust line carries a temperature detector (not shown) arranged on the exhaust line, more particularly at the SCRF filter inlet, which allows to know at any time the temperature of the exhaust gas circulating in this line. Alternatively, logic and/or computer means can be provided, which allow to estimate at any time the temperature of the exhaust gas circulating in the line.

This line can also comprise a NOx detector (not shown) arranged at the outlet of SCRF filter 20 which allows to know at any time the amount of NOx flowing from the SCRF filter. Similarly, logic and/or computer means can also be provided, which allow to estimate at any time this amount of NOx.

The fluid fed into the exhaust line by injector 24 is carried through a pipe 38 connecting this injector to a tank 40 containing this fluid. The fluid is circulated between the tank and the injector under the effect of a pumping means such as a metering pump 42.

Injection of the fluid according to the invention is for example triggered by the engine control unit so as to meet a need for the necessary amount of fluid on the SCR catalyst in order to perform effective NOx reduction.

The fluid is injected depending on the operating conditions of the internal-combustion engine.

The injections can be carried out regularly, for example with a period typically ranging between some milliseconds and several tens of seconds, depending on the engine operating conditions, which allows to promote homogeneous mixing of the catalyst with the soot particles and to provide an intimate admixture of particles and catalyst.

In fine, injecting the fluid according to the invention allows to either promote the continuous regeneration phenomenon in the particulate filter and thus to space out the PAF active regeneration periods, or to accelerate oxidation of the particles during the PAF active regeneration phases, thus allowing to limit the fuel consumption relative to this phase and/or to maximize the chances of burning a significant mass of soot particles when the temperature and gas composition conditions are favourable to this active regeneration, or a combination of these two advantages.

For operation, the engine control unit that any engine is usually provided with knows at any time the exhaust gas temperature and the amount of NOx at the SCRF filter outlet.

Thus, the injection can for example be performed if the previously determined exhaust gas temperature exceeds a threshold value allowing the nitrogen oxides NOx treatment to be started.

Advantageously, the amount of fluid injected into the exhaust line is substantially proportional to the formation of NOx and it is determined by the engine control unit.

Injection of the fluid upstream from the SCRF filter throughout the particle filter loading phase allows intimate mixing of the catalytic regeneration additive and the particles within the SCRF filter. The combination of the catalytic activity of the additive and the intimate contact between the particles and this catalytic additive allows to lower the temperature at which combustion of the particles starts, so as to make it compatible with the temperatures usually encountered at the exhaust of engines. If need be, an additional heat supply can be provided by addition of a post-injection during which the hydrocarbons are oxidized on oxidation catalyst 22, thus generating a heat release at inlet 26 of the SCRF filter.

According to a variant, instead of a single device consisting of the catalyzed SCRF filter, the exhaust gas treatment system comprises a particle filtration device distinct from the NOx selective catalytic reduction device. According to this configuration, a catalyst of SCR catalyst type is arranged upstream from the PAF. In this configuration, the injector is arranged upstream from the SCR catalyst.

According to another variant, in contrast, it is the PAF that is arranged upstream from the SCR type catalyst. In this configuration, the injector is arranged upstream from the PAF.

The exhaust line comprises, in any one of these two variants, an injector for the fluid according to the invention comprising a metallic compound for regenerating the particles of the particulate filter and a reductant for NOx elimination by the SCR catalyst. This injector is arranged upstream from the exhaust gas treatment means (SCR catalyst or PAF) that is the closer to oxidation catalyst 22.

Of course, without departing from the scope of the invention, the exhaust line comprising SCRF filter 20 or the exhaust line comprising an SCR catalyst and a particulate filter can comprise additional catalysts, for example an SCR catalyst in addition to the SCRF filter, and/or a clean-up catalyst, etc.

EXAMPLES

The examples below illustrate, by way of non limitative example, the preparation of depollution fluids according to the invention (examples 1 to 3), and some performances of an example of a fluid according to the invention for depollution of the exhaust gas of a Diesel engine (example 4).

The fluids can be prepared at ambient temperature or at a temperature below 60° C., higher than the crystallization temperature of urea (−11° C.).

Examples 1 to 3 show that it is possible to obtain a homogeneous aqueous solution stable over time. Examples 1 to 3 described below are all conducted using commercial AdBlue® and basic copper carbonate.

Example 1: Solution Containing 350 ppm Copper Ions

In this example, the fluid is prepared as follows: 100 g AdBlue® are fed into a 250-cm$^3$ glass bottle containing a magnetic bar, and 0.061 g of a basic copper carbonate of formula $Cu_2(CO_3)(OH)_2$ (malachite) is added under stirring. This amount of malachite corresponds to a final concentration in the solution of 350 ppm copper in ionic form. After 15 min stirring at ambient temperature, the aspect of the solution is evaluated immediately after it was prepared, and after one week after storage at ambient temperature.

It can be seen that the solution is homogeneous and it still is after one week. No precipitation is observed.

Example 2: Solution Containing 500 ppm Copper Ions

In this example, the fluid is prepared as follows: 1000 g AdBlue® are fed into a 2-litre Erlenmeyer flask containing a magnetic bar, and 0.87 g of a basic copper carbonate of formula $Cu_2(CO_3)(OH)_2$ (malachite) is added under stirring. This amount of malachite corresponds to a final concentration in the solution of 500 ppm copper in ionic form. After 2 hours stirring at ambient temperature, the aspect of the solution is evaluated immediately after it was prepared, and after one week after storage at ambient temperature.

It can be seen that the solution is homogeneous and it still is after one week. No precipitation is observed.

Example 3: Solution Containing 80 ppm Copper Ions

In this example, the preparation mode is similar to that of example 1, except that the amount of basic copper carbonate $Cu_2(CO_3)(OH)_2$ added to the AdBlue® solution is 0.0139 g. This amount of malachite corresponds to a final concentration in the solution of 80 ppm copper in ionic form.

The aspect of the solution is evaluated immediately after it was prepared, and after one week after storage at ambient temperature. It can be seen that the solution is homogeneous and it still is after one week. No precipitation is observed.

Example 4

This example applies to the depollution of exhaust gas of a thermal engine, more precisely a Diesel engine. The Diesel engine is equipped with an exhaust line containing an oxidation catalyst, followed by a mixer and a selective catalytic reduction filter SCRF. This configuration is similar to that illustrated in FIG. 1 showing an oxidation catalyst 22, followed by the mixer (no reference number) and SCRF filter 20.

A fluid prepared according to example 3 is injected upstream from the mixer and the SCRF catalyst by means of injector 24 so as to obtain, on the one hand, a selective NOx reduction reaction with the ammonia resulting from the decomposition of the aqueous urea solution (AdBlue®) and, on the other hand, to provide aid for regeneration of the soot particles stored in the SCRF filter. This depollution method using a single product intended both for NOx reduction and regeneration aid for the soot stored in a conventional PAF or a catalyzed SCRF filter is described in detail above, as well as in patent application WO-2016/091,657.

Figure 2:
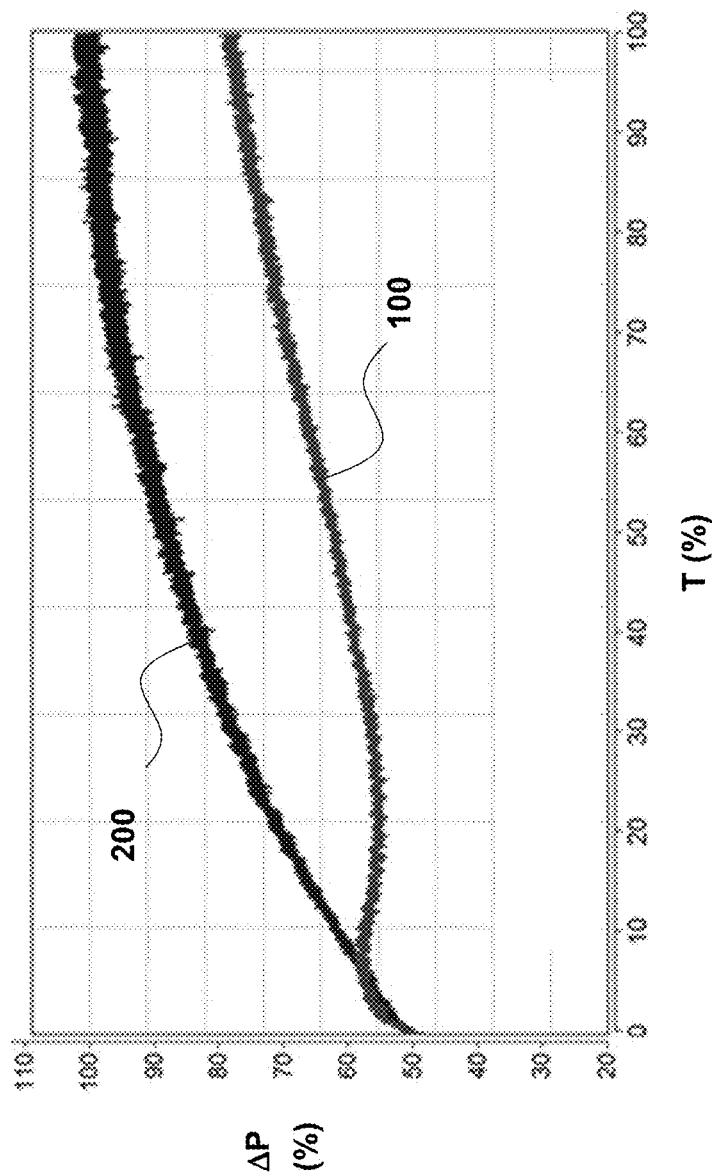
FIG. 2 is a graph that illustrates the pressure drop as a function of time in an SCRF filter of a gas exhaust line of a Diesel engine, during a soot loading phase thereof, for a depollution fluid according to the prior art and according to the invention.
Figure 3:
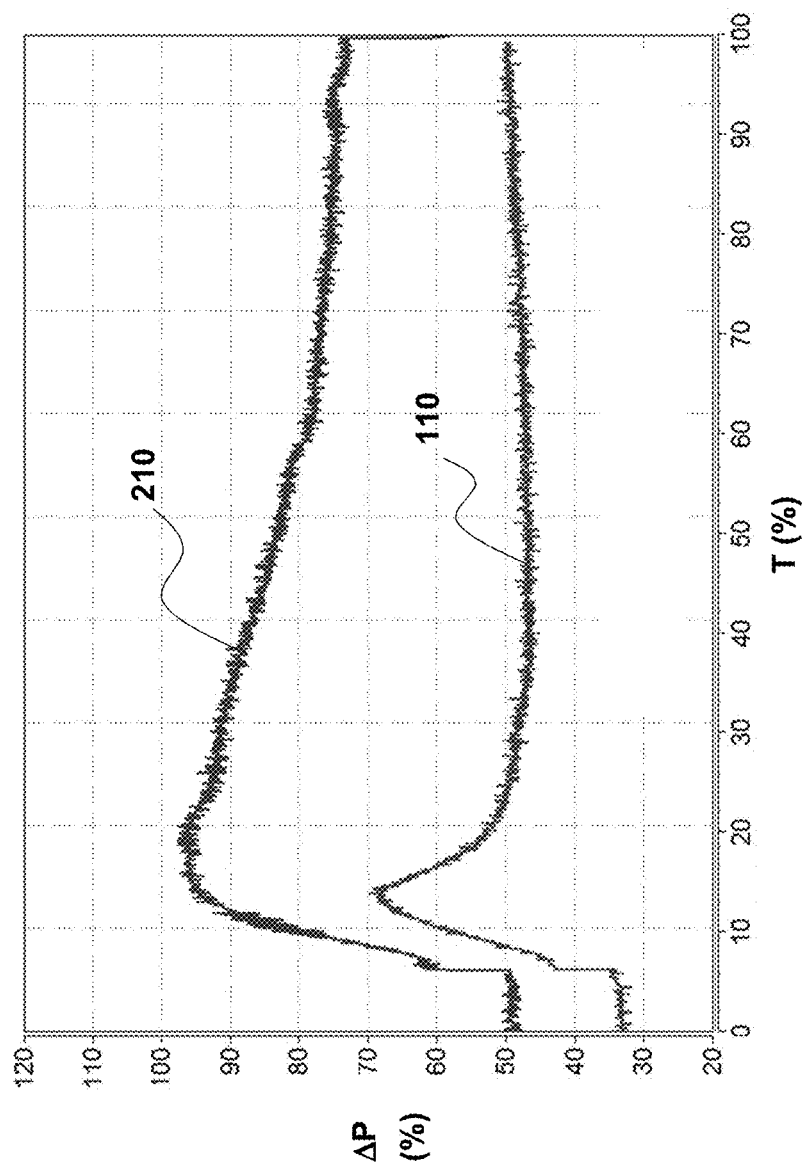
FIG. 3 is a graph that illustrates the pressure drop as a function of time in an SCRF filter of a gas exhaust line of a Diesel engine, during an active regeneration phase, for a depollution fluid according to the prior art and according to the invention.

FIGS. 2 and 3 illustrate the efficiency of the fluid of example 3, by comparison with commercial AdBlue® alone (without the addition of a soluble basic metal carbonate).

FIG. 2 shows the evolution of the pressure drop generated by the SCRF filter over time when traversed by exhaust gas containing soot particles (loading time as the abscissa, in %, and dimensionless pressure drop as the ordinate, in %). It can be easily seen that, under strictly identical engine and exhaust conditions (exhaust gas temperature, amount of gas and particles), the pressure drop increase is reduced when using the depollution fluid of example 3 (curve 100) by comparison with AdBlue® alone (curve 200). The pressure drop being related to the amount of soot particles trapped in the filter, it may be concluded that the amount of soot particles is lower in the SCRF filter when using a fluid according to example 3, said fluid allowing partial oxidation of the soot particles referred to as continuous regeneration by the person skilled in the art (continuous regeneration during the PAF or SCRF loading phase). The pressure drop reduction is accompanied by a reduction in the soot mass obtained at the end of the loading phase, of the order of 30%.

To complete the PAF or SCRF regeneration, it is necessary to periodically perform a more complete oxidation of the stored soot particles, commonly referred to as active regeneration. FIG. 3 describes the evolution of the pressure drop over time during this active regeneration phase for an exhaust gas temperature of 600° C. (active regeneration time as abscissa, in %, and dimensionless pressure drop as ordinate, in %). It can be noted in FIG. 3 that the pressure drop decrease after a maximum is much faster when using the fluid according to example 3 (curve 110), by comparison with the reference AdBlue® solution (curve 210). During this active regeneration, using the fluid of example 3 allows to increase the combustion rate of the soot particles by means of the catalysis phenomenon described above, which represents a PAF or SCRF regeneration aid.

In addition to the evolution of the pressure drop, the residual soot particle mass at the end of a 30-min active regeneration was also measured. While the unburnt soot represented 68% of the mass of soot particles loaded in the reference case using a pure AdBlue® solution (curve 210), it is no more than 22% when using the fluid according to example 3.

The invention claimed is:

1. A fluid for depollution of exhaust gas, notably from internal-combustion engines, the fluid comprising a homogeneous aqueous solution of at least one reductant or reductant precursor for elimination of nitrogen oxides NOx contained in the exhaust gas, the at least one reductant or reductant precursor comprising urea in solution in pure water, the aqueous solution further comprising a metallic additive for catalyzing the oxidation of exhaust gas particles in a particulate filter, the metallic additive being a basic metal carbonate soluble in the aqueous solution.

2. A fluid as claimed in claim 1, wherein the at least one reductant or reductant precursor is 32.5±0.7 mass % urea in solution in pure water and meeting the specifications of the ISO 22241-1 standard.

3. A fluid as claimed in claim 1, wherein the basic metal carbonate belongs to the 05.BA family in the Nickel-Strunz classification.

4. A fluid as claimed in claim 3, wherein the basic metal carbonate is selected from the list made up of basic copper carbonate of chemical formula $Cu_3(CO_3)_2(OH)_2$, basic copper carbonate of chemical formula $Cu_2(CO_3)(OH)_2$, basic nickel carbonate of chemical formula $Ni_2(CO_3)(OH)_2$, basic copper and nickel carbonate of chemical formula $(Cu,Ni)_2(CO_3)(OH)_2$.

5. A fluid as claimed in claim 4, wherein the basic metal carbonate is the basic copper carbonate of chemical formula $Cu_2(CO_3)(OH)_2$.

6. A fluid as claimed in claim 1, wherein the fluid does not contain an additional agent for complexing, liganding, chelating a metal ion of the metallic additive.

7. A method for preparing the exhaust gas depollution fluid as claimed in claim 1, wherein a basic metal carbonate soluble in an aqueous solution of at least one reductant or reductant precursor compound is added thereto so as to form a homogeneous solution.

8. A preparation method as claimed in claim 7, wherein addition of the basic metal carbonate to the aqueous solution is performed under stirring.

9. A method for depollution of exhaust gas comprising particulates and nitrogen oxides NOx in an internal-combustion engine, comprising injecting the fluid as claimed in claim 1 into the exhaust gas upstream from exhaust gas treatment systems comprising particle filtration and selective catalytic reduction of nitrogen oxides NOx, injection being carried out depending on the operating conditions of the internal-combustion engine.

10. The method as claimed in claim 9, wherein injection is carried out if the previously determined exhaust gas temperature exceeds a threshold value allowing the treatment of the nitrogen oxides NOx to be started.

11. The method as claimed in any claim 9, wherein particle filtration and selective catalytic reduction of nitrogen oxides NOx are performed in a single device, a catalyzed SCRF filter.

12. The method as claimed in claim 9, wherein particle filtration is conducted in a particulate filter PAF upstream from a catalysis device for selective catalytic reduction of nitrogen oxides NOx, the injection of the fluid being carried out upstream from the particulate filter PAF.

13. The method as claimed in claim 9, wherein selective catalytic reduction of nitrogen oxides NOx is performed in a SCR catalysis device upstream from the particle filtration in a particulate filter PAF, the injection of the fluid being carried out upstream from the SCR catalysis device.

14. A fluid as claimed in claim 3, wherein the basic metal carbonate is selected from the list made up of basic copper carbonate of chemical formula $Cu_3(CO_3)_2(OH)_2$ and basic copper carbonate of chemical formula $Cu_2(CO_3)(OH)_2$.

* * * * *